(12) United States Patent
Hitt (10) Patent No.: US 7,789,321 B2
(45) Date of Patent: Sep. 7, 2010

(54) WIRELESS SPRINKLER CONTROL

(75) Inventor: Dale K. Hitt, San Jose, CA (US)

(73) Assignee: Digital Sun, Inc., San Jose, CA (US)

( * ) Notice: Subject to any disclaimer, the term of this patent is extended or adjusted under 35 U.S.C. 154(b) by 599 days.

(21) Appl. No.: 11/220,289

(22) Filed: Sep. 6, 2005

(65) Prior Publication Data

US 2006/0049271 A1 Mar. 9, 2006

Related U.S. Application Data (60) Provisional application No. 60/607,706, filed on Sep. 7, 2004.

(51) Int. Cl.
*A01G 25/00* (2006.01)
*B05B 15/10* (2006.01)

(52) U.S. Cl. .................................. 239/63; 239/207

(58) Field of Classification Search ............ 239/63, 239/68–70, 436, DIG. 15, 562, 551, 200–207; 137/78.3, 80; 700/284
See application file for complete search history.

(56) References Cited

U.S. PATENT DOCUMENTS

| | | | |
|---|---|---|---|
| 3,783,804 A | 1/1974 | Platz | |
| 3,794,992 A | 2/1974 | Gehman | |
| 4,184,789 A | 1/1980 | Gilde, Jr. | |
| 4,445,788 A | 5/1984 | Twersky et al. | |
| 4,567,563 A | 1/1986 | Hirsch | |
| 4,684,920 A | * 8/1987 | Reiter | 340/310.11 |
| 4,726,239 A | 2/1988 | Boggess et al. | |
| 4,814,608 A | 3/1989 | Dempsey et al. | |
| 4,847,781 A | 7/1989 | Brown, III et al. | |
| 4,852,802 A | 8/1989 | Iggulden et al. | |
| 4,852,804 A | * 8/1989 | Baier et al. | 239/121 |
| 5,150,622 A | 9/1992 | Vollweiler | |
| 5,209,129 A | 5/1993 | Jaselskis et al. | |
| 5,251,153 A | * 10/1993 | Nielsen et al. | 700/284 |
| 5,385,297 A | 1/1995 | Rein et al. | |
| 5,408,893 A | 4/1995 | McLeroy | |
| 5,418,466 A | 5/1995 | Watson et al. | |

(Continued)

FOREIGN PATENT DOCUMENTS

GB  2 247 951 A  3/1992

OTHER PUBLICATIONS

IEEE, "Wireless Medium Access Control (MAC) and Physical Layer (PHY) Specifications for Wirelss Personal Area Networks (WPANS)," IEEE Std 802.15.1™ -2002, 2002, 9 pages, IEEE.

(Continued)

*Primary Examiner*—Davis Hwu
(74) *Attorney, Agent, or Firm*—Inskeep IP Group, Inc.

(57) ABSTRACT

The present invention provides a system and method to control the flow duration and the flow rate of each individual sprinkler head wirelessly in each zone of an automatic sprinkler system. The system comprises a plurality of sensors, preferably wireless, to control the sprinkler heads, either directly or through a controller. The system enables precise control over irrigation times for the areas covered by each sprinkler head. The system also enables each sprinkler head to control its on/off and duration decisions based on receiving data from a sensor within an irrigation zone of an automatic sprinkler system.

18 Claims, 8 Drawing Sheets

U.S. PATENT DOCUMENTS

| | | | |
|---|---|---|---|
| 5,635,710 | A | 6/1997 | Reed et al. |
| 5,726,644 | A | 3/1998 | Jednacz et al. |
| 5,737,318 | A | 4/1998 | Melnik |
| 5,740,031 | A | 4/1998 | Gagnon |
| 5,778,332 | A | 7/1998 | Chang et al. |
| 5,813,606 | A * | 9/1998 | Ziff .............................. 239/67 |
| 5,898,733 | A | 4/1999 | Satyanarayana |
| 5,909,429 | A | 6/1999 | Satyanarayana et al. |
| 5,926,101 | A | 7/1999 | Dasgupta |
| 5,978,364 | A | 11/1999 | Melnik |
| 6,061,440 | A | 5/2000 | Delaney et al. |
| 6,097,703 | A | 8/2000 | Larsen et al. |
| 6,195,018 | B1 | 2/2001 | Ragle et al. |
| 6,195,108 | B1 | 2/2001 | Kanno |
| 6,208,247 | B1 | 3/2001 | Agre et al. |
| 6,275,500 | B1 | 8/2001 | Callaway, Jr. et al. |
| 6,283,139 | B1 * | 9/2001 | Symonds et al. ............ 137/78.3 |
| 6,298,285 | B1 * | 10/2001 | Addink et al. ............... 700/284 |
| 6,452,499 | B1 | 9/2002 | Runge et al. |
| 6,504,834 | B1 | 1/2003 | Fifield |
| 6,553,336 | B1 | 4/2003 | Johnson et al. |
| 6,600,971 | B1 | 7/2003 | Smith et al. |
| 6,601,440 | B1 | 8/2003 | Chuang |
| 6,660,971 | B2 | 12/2003 | Terada et al. |
| 6,665,278 | B2 | 12/2003 | Grayson |
| 6,685,104 | B1 * | 2/2004 | Float et al. ..................... 239/63 |
| 6,705,553 | B2 * | 3/2004 | Drechsel ..................... 239/728 |
| 6,752,362 | B1 | 6/2004 | Gretz |
| 6,842,430 | B1 | 1/2005 | Melnik |
| 7,240,743 | B2 | 7/2007 | Buss et al. |
| 7,264,177 | B2 * | 9/2007 | Buck et al. ..................... 239/63 |
| 7,281,439 | B2 | 10/2007 | Schmitt et al. |
| 2002/0002425 | A1 | 1/2002 | Dossey et al. |
| 2002/0112531 | A1 | 8/2002 | Hubbell et al. |
| 2002/0144453 | A1 | 10/2002 | Su |
| 2006/0178847 | A1 | 8/2006 | Glancy et al. |

OTHER PUBLICATIONS

Maltz, David A., et al., "Experiences Designing and Building a Multi-Hop Wireless Ad Hoc Network Testbed," Mar. 5, 1999, 22 pages, School of Computer Science, Carnegie Mellon University, Pittsburgh, Pennsylvania.

Garcia-Luna-Aceves, J.J. et al., "Wireless Internet Gateways (WINGS)," 1997, 7 pages, University of California at Santa Cruz, Department of Computer Engineering, Santa Cruz, California.

Daly, J., Ed., "Distribution, Networks, and Networking: Options for Dissemination," Jun. 9-10, 1992, 7 pages, Workshop on Electronic Texts—Session III Proceedings, Library of Congress, Washington, D.C.

Brownrigg, E., "User Provided Access to the Internet," Nov. 30-Dec. 2, 1992, Proceedings of The Fifth International Conference on New Information Technology, Hong Kong.

Lynch, Clifford A. et al., Packet Radio Networks, 1987, 242 pages, University of California, Berkeley, California.

Jubin, John, et al., "The DARPA Packet Radio Network Protocols," Jan. 1987, pp. 21-34, Proceedings of the IEEE, vol. 75, No. 1.

Shacham, N., et al., "A Packet Radio Network for Library Automation," Oct. 19-22, 1987, pp. 456-462, Proceedings of the 1987 IEEE Military Communications Conference. (MILCOM '87), New York: IEEE Press vol. 2.

Westcott, J.A., "Issues in Distributed Routing for Mobile Packet Radio Networks," 1982, pp. 233-238, IEEE.

Kahn, R.E., "The Organization of Computer Resources into a Packet Radio Network," Jan. 1977, pp. 169-178, IEEE Transactions on Communications, vol. 25, No. 1.

* cited by examiner

Figure 1: Illustration of a zone with one sensor and multiple sprinklers.

WIRELESS SPRINKLER CONTROL

This application claims priority from U.S. provisional application Ser. No. 60/607,706 filed Sep. 7, 2004, entitled "Wireless Sprinkler Control", which is incorporated herein by reference.

FIELD OF THE INVENTION

The invention generally relates to a wireless sensor system for environmental monitoring and specifically relates to the control of a sprinkler system in an irrigation system.

BACKGROUND OF THE INVENTION

Irrigation systems have been used for applying water to the vegetation. One common use of irrigation systems is for watering of the lawn. Such systems include sprinklers distributed over the area, underground water supply pipes to the sprinklers, and valves to open and close the water supply pipes, and central timing controller to operate the valves in accordance to a stored schedule in the controller. The controller controls multiple valves with each valve typically controls multiple sprinkler heads in a zone. Most controllers sends signals to open and close the valves at designated intervals, typically calculated to provide a uniform and maximum amount of water required for each zone. This scheme of supplying water at a fixed amount throughout a large area can be wasteful since the vegetation area is thus watered automatically regardless of the changes in the need of water. Environmental conditions, such as rain, sunlight, wind and cloud, temperature change, humidity, soil moisture, or even a leakage sprinkler pipe or sprinkler head, can also change the amount of water needed at the time. It is thus beneficial to employ an irrigation system that can take the environmental conditions into account to adjust the amount of water accordingly. The system would provide a significant saving in water, energy, and money to the users.

Control systems for automatic irrigation systems used for landscape and agricultural maintenance are known. Most common types of environmental monitoring and control for irrigation systems incorporate a means of controlling the start time and duration of watering cycles via a central timing controller. Often the environmental control is through seasons such as watering more on dry season and less on rainy season. In conventional control system, the primary means for halting an automatic watering cycle when certain environmental event occurs is by an operator manually suspending the cycle at the irrigation controller. In most situations this proves to be an ineffective means of conserving resources due to the inconsistent and inefficient methods followed by the operator. In fact, quite often the operator ignores the need to suspend the watering cycle altogether, and in some cases neglects to resume the watering cycle when required, leading to both over-watered and under-watered landscaping. Operator interruption is also less effective since the controller are normally programmed to operated at the very late evening or early in the morning, where most people would be at rest.

It is because of this unreliable and inconvenient manual method that environmental sensors were developed that allow for an automatic interruption of the controller due to an environmental condition. The use of sensors for irrigation systems has proven to be an effective and economical method of conserving water, energy, and money.

Existing automatic sprinkler controllers for residential and commercial applications are typically wired so that a central controller provides drive signals to each valve in the system to supply water to the sprinkler heads supplied by the valve. Thus, all sprinkler heads connected to a valve emit water at a fixed rate when the valve is turned on. The duration that the valve is turned on determines the amount of water applied to the area covered by each sprinkler head. The irrigation system can be divided into multiple zones for watering. Each zone may contain one valve, or many valves. Each valve is connected to multiple sprinkler heads. When a valve is activated, all the sprinklers connected to the valve will emit water at a fixed rate and in the same time duration.

The amount of water needed for different zone, or areas of the irrigation system is different, based on the location and the geography of the area. The moisture level, the amount of sunlight received at each zone, can be different from each other. The amount of water needed and correspondingly the valve on duration required for the sprinkler heads may be different in the zones. For example, one half of a zone may be in the sunny area while the other is covered by a deep shade. In this case, the sunny section of the zone will require more water than the shaded section of the zone. This is often addressed by using sprinkler heads that have different (but fixed) flow rates. The heads for the sunny section could have 0.2 gallon per minute flow rate and the heads for the shady section could have 0.1 gallon per minute flow rate. Another way is to have different zones with the same flow rate but with different timing. However, this does not accommodate changes over time like changes in shading or plan materials.

SUMMARY OF THE INVENTION

The present invention provides a system and method to control the flow duration and the flow rate of each individual sprinkler head wirelessly in each zone of an automatic sprinkler system. The system comprises a plurality of sensors, preferably wireless, to control the sprinkler heads, either directly or through a controller. The system enables precise control over irrigation times for the areas covered by each sprinkler head. The system also enables each sprinkler head to control its on/off and duration decisions based on receiving data from a sensor within an irrigation zone of an automatic sprinkler system.

DETAILED DESCRIPTION OF THE INVENTION

The present invention provides a system and method to control the flow duration and the flow rate of each individual sprinkler head wirelessly in each zone of an automatic sprinkler system. The system comprises a plurality of sensors, wire or wireless, to control the sprinkler heads, either directly or through a controller. The system enables precise control over irrigation times for the areas covered by each sprinkler head. The system also enables each sprinkler head to control its on/off and duration decisions based on receiving data from a sensor within an irrigation zone of an automatic sprinkler system.

The wireless sensor in each area of influence of each sprinkler head in a zone communicates wirelessly to the sprinkler head associates with its area of influence to provide the data required determining the amount of water to apply. The sprinkler head could send commands to a central controller to request a minimum duration for the controller to power its zone on the next watering cycle or just inform the controller of the current settings/requirements so that the controller can determine the time. The sprinkler valve can run completely autonomously without a central controller. The sensor or the sprinkler head can determine the start time and stop time for the duration, the water flow rate, based on the data from the sensor. Sprinkler valves can send coordination commands to other sprinkler valves to prevent two or more valves to be on simultaneously to reduce the water pressure. User input to the valves can be provided through wireless nodes that possess a user interface.

Figure 1:
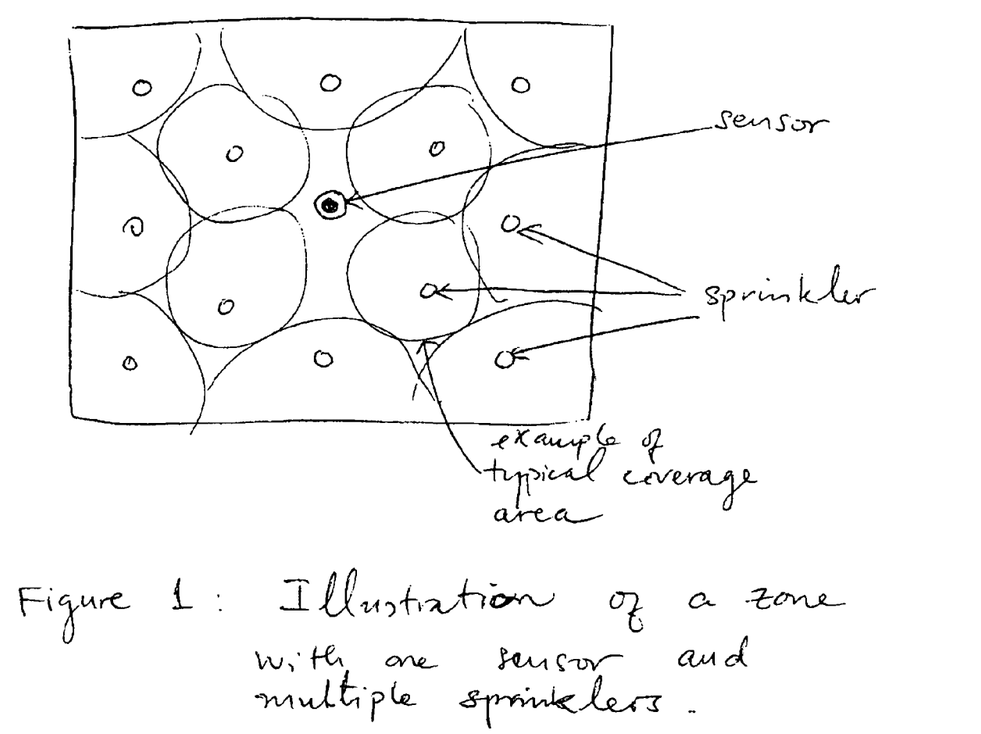
FIG. 1 shows an embodiment of a zone with one sensor and multiple sprinklers.

The system is equipped with sprinkler heads, and sensors in each zone of an automatic sprinkler system. The system is divided into different zones. Each zone ideally would have similar moisture, humidity, sunlight, and plant characteristics. Each zone may have a single or multiple sensors and sprinkler heads. FIG. 1 illustrates a single zone with one sensor and multiple sprinkler heads covering the area of the zone. The moisture sensor can detect light, soil temperature, humidity, moisture level, and the fertilizing content in the soil. The sensor can receive and transmit signals wirelessly to other wireless devices, such as other sensors, sprinkler heads, and the central controller. The sprinkler head is equipped with a wireless transceiver or a wireless receiver. The wireless transceiver receives data and/or commands from sensors and/or a central controller and/or other sprinkler heads and/or other wireless network nodes. The wireless sprinkler head can interpret the data/commands from the wireless network to determine how long to let water flow and/or the flow rate for the sprinkler head.

The present invention also describes a distributed watering system for an automatic sprinkler system. Instead of the central controller making decision on when to turn on and off the water flow, and sending the signals to the valve heads and the zones, the decision is distributed to each single zone with its sensors and sprinkler heads. The components in each zone will decide on the length of the on duration, and the water flow rate, for the zone, based on the data input from the sensors. The decision can be from the sensors and transmitted to the corresponding sprinkler heads in the zone. The decision can be from selected sprinkler heads that receive the data from the sensors, and determine the duration time and flow rate, and then transmit the decision to other sprinkler heads in its group or zone. The decision can also be from each sprinkler head that receives the data from the sensors, and determine its own duration time and flow rate.

Figure 2A:
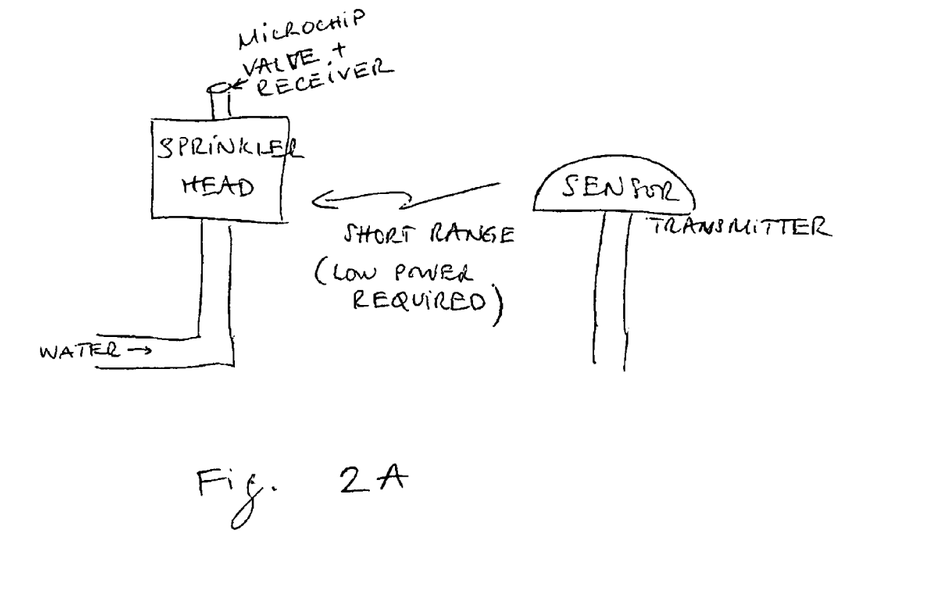
FIG. 2A shows an embodiment of the present invention where a microchip controller is located in the sprinkler head.
Figure 2B:
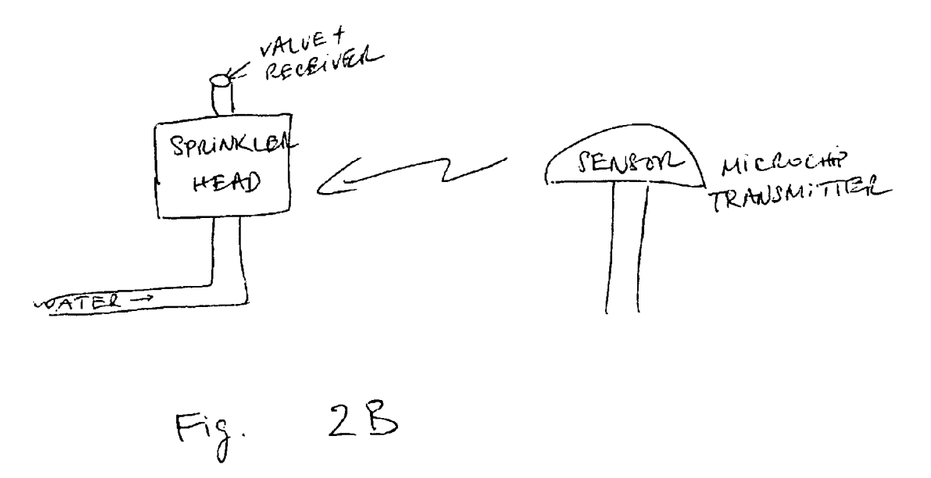
FIG. 2B shows an embodiment of the present invention where a microchip controller is located in the sensor.
Figure 2C:
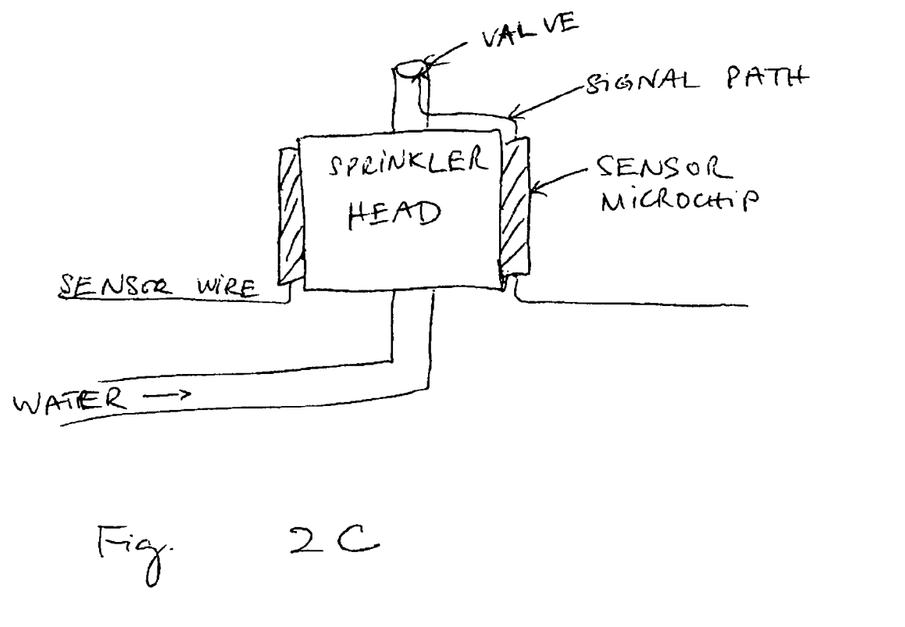
FIG. 2C shows an embodiment of the present invention where the sensor is integrated into the sprinkler head.

In one embodiment of the invention, each zone in the irrigation system comprises pairs of one sprinkler head and one sensor. Each sensor detects the moisture level, humidity, sunlight level, etc. and sends the data signals to its corresponding sprinkler head. The sensor can be connected to the sprinkler head by an electrical wire to transmit the signal. Preferably, the sensor is equipped with a wireless transmitter, and the sprinkler head a wireless receiver, to allow the signal to be sent wirelessly, as shown in FIG. 2A. The sprinkler head will use the data to determine the amount of water required in its area, by controlling the on duration and the water flow rate. In this embodiment, the sprinkler head is equipped with a microchip that is capable of determining the duration time and flow rate based on the input data from the sensor. The sensor is position relatively close to the sprinkler head, that short range low power wireless transmitter and receiver can be used. Alternatively, the microchip can be included in the sensor instead of the sprinkler head, as shown in FIG. 2B. In this case, the sensor will determine the amount of water needed in its area, and sends the commands to the sprinkler head with the appropriate duration time and flow rate. In both cases, the sensor is position as close to the sprinkler head as possible so that the sprinkler head can respond to the condition of the soil around the sensor as much as possible. In a preferred embodiment, the sprinkler head and the sensor are combined into one unit as shown in FIG. 2C, thus eliminating the need for long electrical connection between the sprinkler head and the sensor or the need for wireless transmitter and receiver. The sensor can send coordination commands to other sensors to coordinate a sequential watering process, to prevent two or more sprinkler heads to be on simultaneously to reduce the water pressure in the line.

Figure 3:
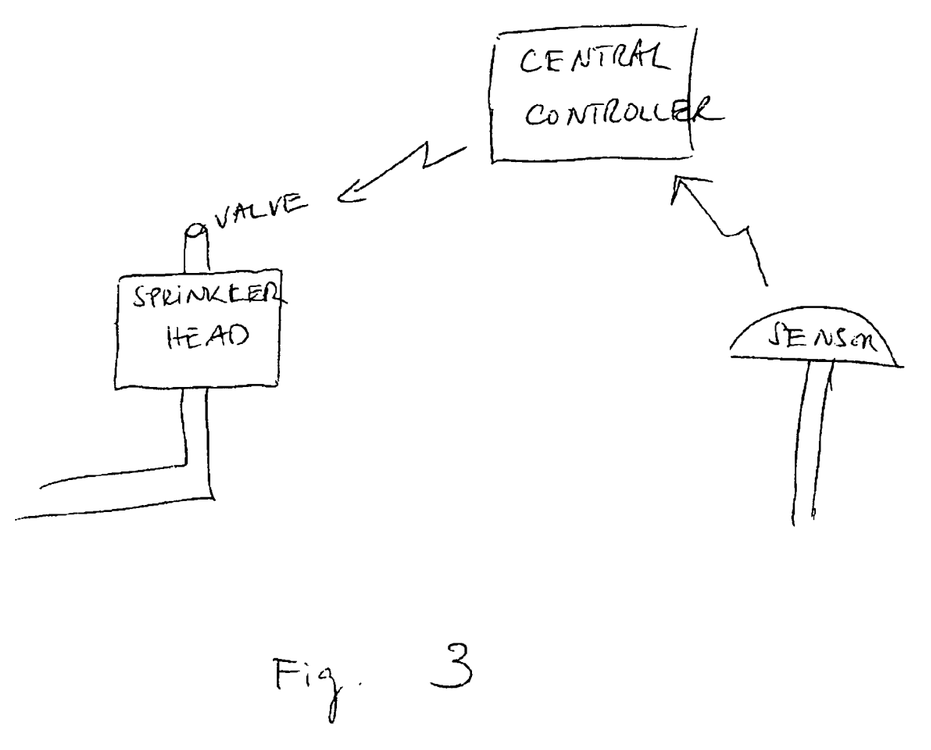
FIG. 3 shows an embodiment of the present invention where a central controller is located separately from the sensor and the sprinkler head.

In another embodiment of the invention, the sensor sends the data to a central controller through electrical wire, or preferably wirelessly, as shown in FIG. 3. The central controller then determines the amount of water to apply and sends the commands to each sprinkler head to adjust the duration time and flow rate individually. Alternatively, the central controller could send the same command to all the sprinkler heads in the zone for a particular on duration time that is the maximum required of all the sprinkler heads/sensors determined from all the sensor data from the zone. The central controller also can send coordination commands to sprinkler heads to coordinate the sequential watering process.

Figure 4A:
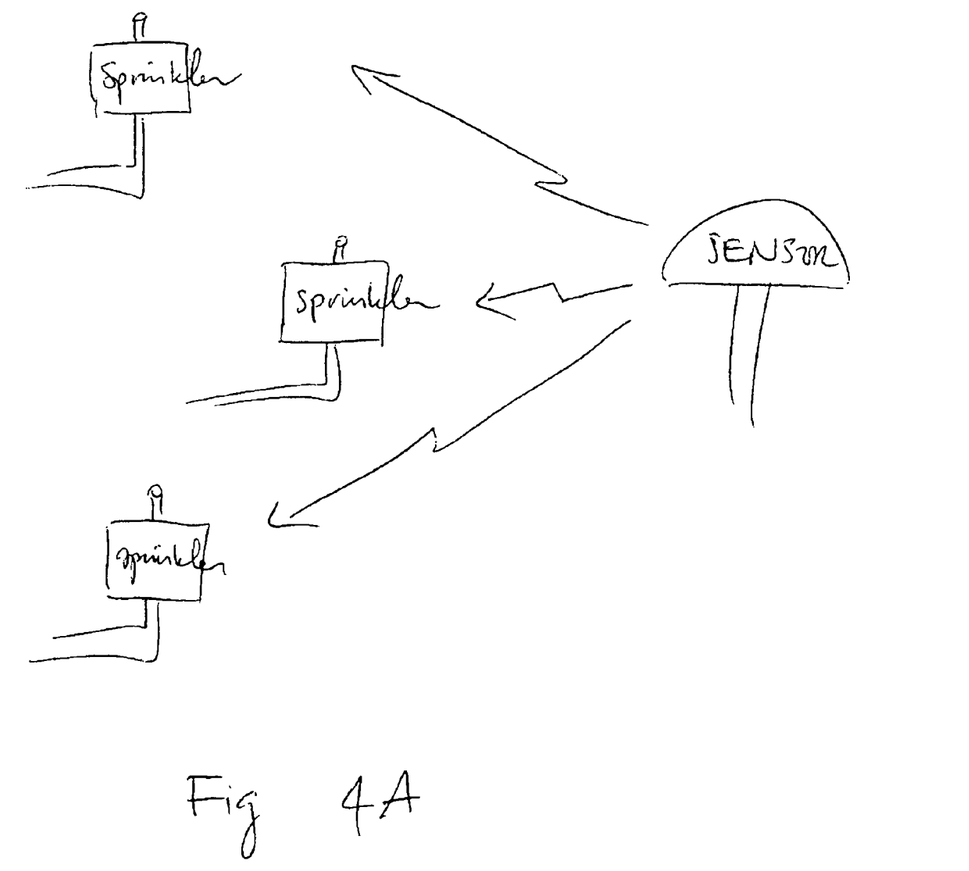
FIG. 4A shows an embodiment of the present invention where the sensor communicates directly to all sprinkler heads.
Figure 4B:
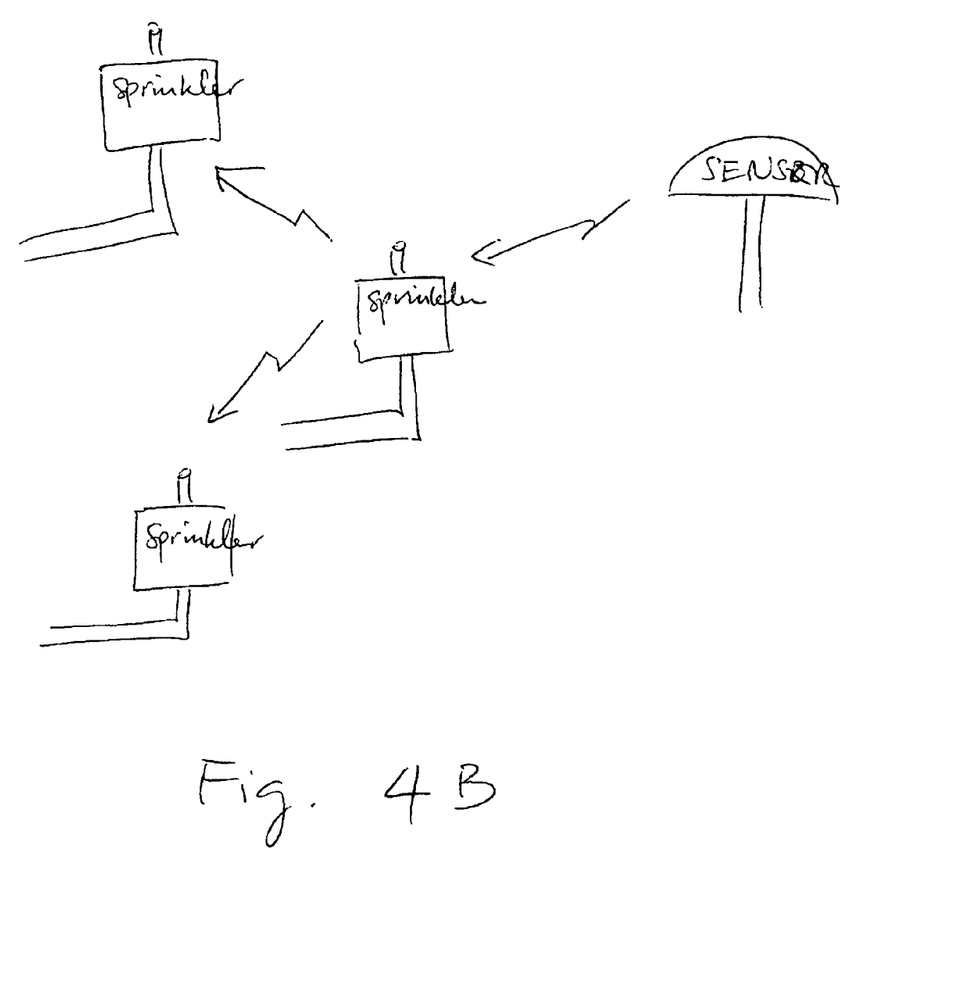
FIG. 4B shows an embodiment of the present invention where the sensor communicates to one central sprinkler head, which then transfers the command to other sprinkler heads.
Figure 4C:
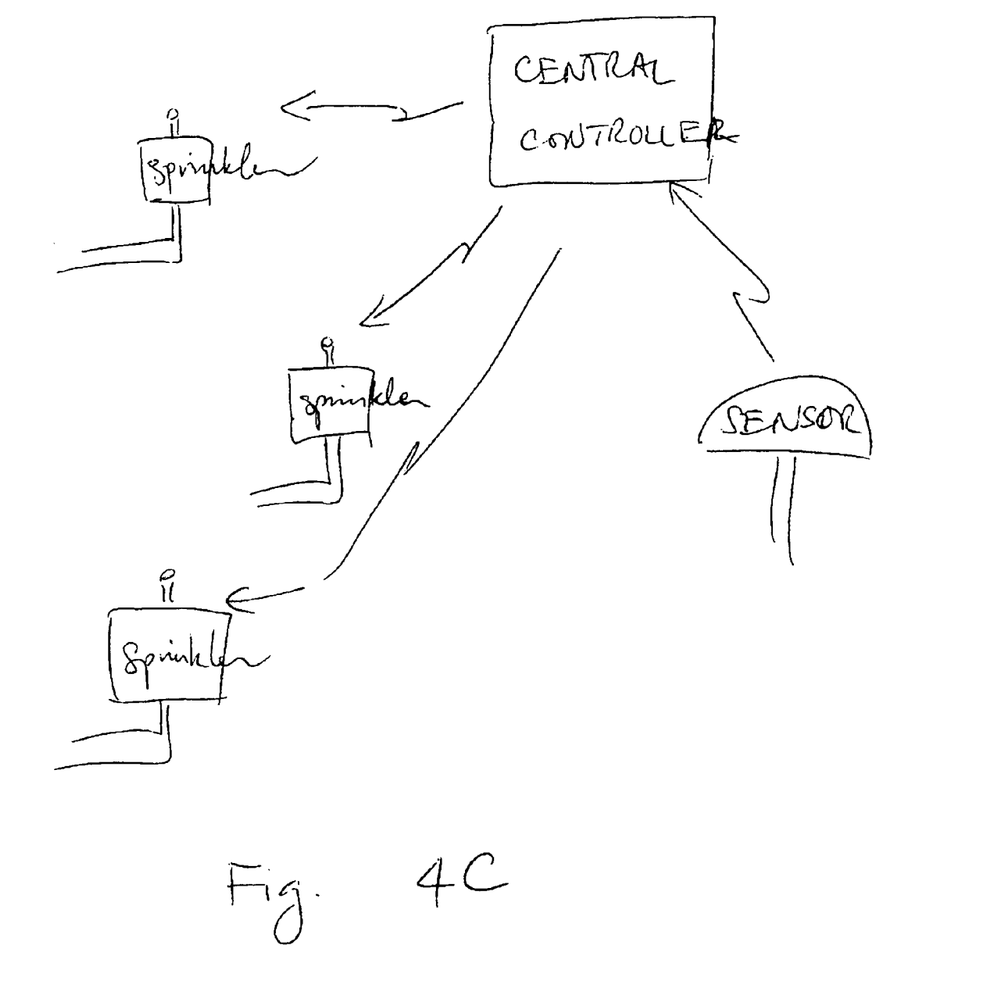
FIG. 4C shows an embodiment of the present invention where the sensor communicates to a central controller, which then transfers the command to all sprinkler heads.

In another embodiment of the invention, each zone in the irrigation system comprises one sensor and multiple sprinkler heads. The sprinkler heads are capable of covering a larger area that has similar soil, humidity, sunlight, and etc. characteristics. Similar to the previous embodiment, the sensor detects the moisture level, humidity, sunlight level, etc. and sends the data signals to the sprinkler heads. The sensor can be connected to the sprinkler heads by electrical wires, or preferably by wireless devices, as shown in FIG. 4A. The sprinkler heads will use the data to determine the amount of water required, by controlling the on duration and the water flow rate. In this embodiment, each sprinkler head is equipped with a microchip that is capable of determining the duration time and flow rate based on the input data from the sensor. In another embodiment, only one sprinkler head in the group/zone can receive the data from the sensor, and has a microchip to determine the amount the water needed for the zone and thus the duration time and flow rate. This sprinkler then transmits the duration time and flow rate to the rest of the sprinkler heads. This is illustrated in FIG. 4B. In this scenario, only one sprinkler head is equipped with a microchip, and the wireless transmitter and receiver. All the other sprinkler heads are equipped only with a wireless receiver. Alternatively, the sensor can send the signal to all the sprinkler heads through a central controller. FIG. 4C shows another embodiment of the invention. The sensor can be communicated with the central controller by an electrical wire, or preferably wirelessly. The central controller then sends the duration time and flow rate commands to all the sprinkler heads in the zone, through electrical wires or preferable wirelessly. All the sprinkler heads in this scenario are equipped with the receivers or wireless receivers.

Figure 5:
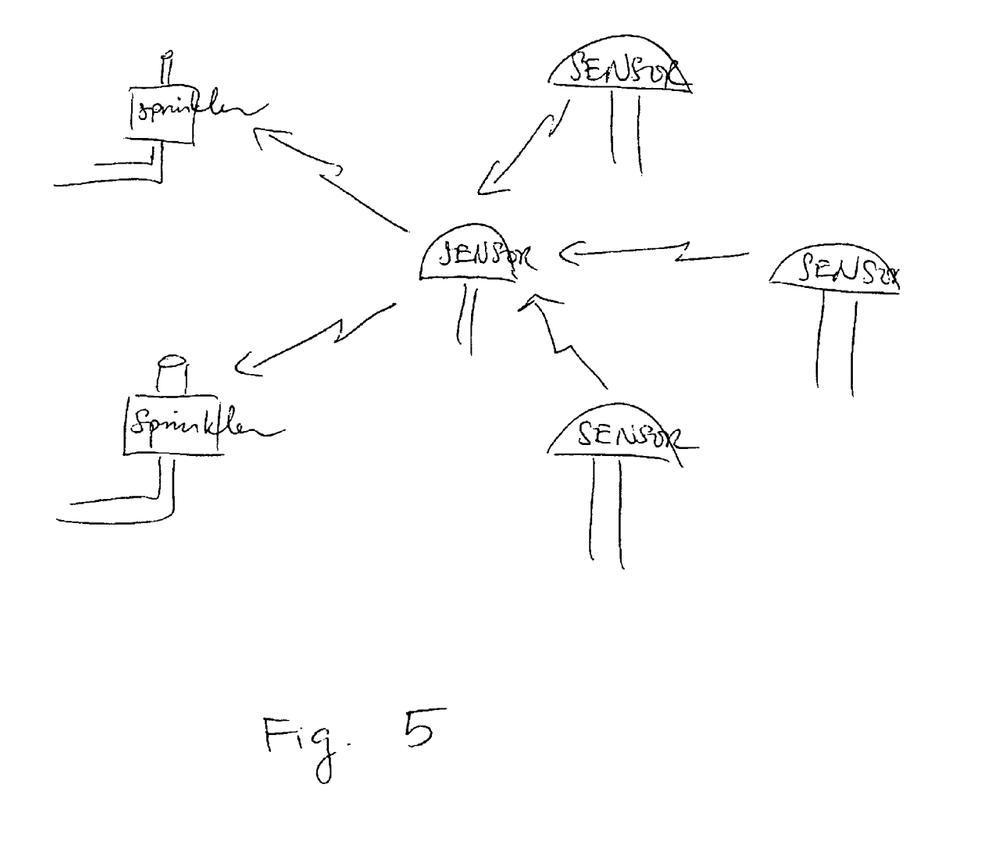
FIG. 5 shows an embodiment of the present invention where the sensors communicate to one central sensor, which then transfers the command to the sprinkler heads.

In another embodiment of the invention, the zone can comprise a group of sensors as shown in FIG. 5. The sensors can send the data to one "smart" sensor to determine the amount of water to apply. This sensor can interpret the input data from all the sensors, and turn on the sprinklers in the zone to a particular time that is the maximum of all the durations required by the sensors. Alternatively, the group of sensors in the zone may send the data to a central controller that would interpret the data and send the commands to all the sprinkler heads.

In another embodiment of the invention, the wireless sensor nodes and the wireless sprinkler head nodes can provide an illustrative map of the locations of all the sensors and sprinkler heads in each zone and in the irrigation system. The wireless sensor nodes and the wireless sprinkler head nodes send the signals to a central controller. The central controller uses the location information to establish the linkage between the wireless sprinkler heads and zones and the wireless sensors. The central controller has a graphical map to illustrate the locations of all the wireless sensors and sprinkler heads in a map of the irrigation system.

The wireless sprinkler heads have similar design to the existing sprinkler heads. The existing sprinkler heads in an irrigation system can be removed, and the wireless sprinkler heads screwed on to replace the removed heads. An adapter is available to match the wireless sprinkler heads to the non-standard heads.

The wireless sprinkler heads and sensors are preferably powered by battery, solar power, or an electric generator that converts the flow of water through the sprinkler head to electricity. The wireless sprinkler heads and the sensors could also be powered from electrical wires connected to the sprinkler or the controller.

The wireless connection is any of the typical available wireless communication such as Bluetooth, radio frequency transmission, infrared transmission, or microwave transmission. The wireless communication can be encoded to prevent interference between different wireless irrigation systems.

What is claimed is:

1. An automatic sprinkler system for providing irrigation to a soil area, the system comprising:
   a first sprinkler head comprising:
      a first sprinkler housing;
      a sensor directly connected to said sprinkler housing for sensing a soil condition;
      a first valve disposed in said sprinkler housing;
      a microchip disposed in said sprinkler housing and in communication with said sensor; said microchip configured to determine an irrigation duration time based on data from said sensor; and
      a first wireless transmitter disposed in said sprinkler housing and in communication with said microchip;
   a second sprinkler head comprising:
      a second sprinkler housing;
      a second valve disposed in said sprinkler housing;
      a second wireless transmitter disposed in said sprinkler housing;
   wherein the first transmitter can wirelessly transmit coordination commands to said second wireless transmitter of said second sprinkler head to coordinate a watering process.

2. A sprinkler system as in claim 1 wherein the soil condition is soil moisture, humidity, sun light, or plant characteristics.

3. A sprinkler system as in claim 1 wherein the sensed soil conditions from the sensor is translated into a command to adjust the water flow rate.

4. A sprinkler system as in claim 1 wherein the sensed soil conditions from the sensor is translated into a command to adjust the watering time of the first sprinkler head and said second sprinkler head.

5. An automatic sprinkler system for providing irrigation to a soil area, the system comprising:
   a plurality of wireless sensors for sensing the soil conditions, the plurality of wireless sensors each comprising a wireless transmitter for transmitting and receiving data related to the sensed soil conditions; and,
   a sprinkler head comprising a wireless receiver for receiving the transmitted data;
   wherein said plurality of wireless sensors are configured to transmit said data to at least one other of said plurality of wireless sensors;
   wherein the sprinkler head waters the soil based on receiving the transmitted data.

6. A sprinkler system as in claim 5 wherein the soil condition is soil moisture, humidity, sun light, or plant characteristics.

7. A sprinkler system as in claim 5 further comprising a microchip controller to process the data received from the wireless sensor into a sprinkler command to control the sprinkler head.

8. A sprinkler system as in claim 5 wherein the at least one other of said plurality of wireless sensors comprises a microchip controller to process the sensed soil conditions into a sprinkler command to control the sprinkler head.

9. A sprinkler system as in claim 5 wherein the sprinkler head comprises a microchip controller to process the data received from the at least one other of said plurality of wireless sensors into a sprinkler command to control the sprinkler head.

10. A sprinkler system as in claim 5 wherein the water flow of the sprinkler head is adjustable and the sensed soil conditions from the plurality of wireless sensors is translated into a command to adjust the water flow rate.

11. A sprinkler system as in claim 5 wherein the sensed soil conditions from the at least one other of said plurality of wireless sensors is translated into a command to adjust the watering time of the sprinkler head.

12. A sprinkler system as in claim 5 wherein the sprinkler head comprises a transmitter to transmit a command of running or not running to coordinate with other sprinkler heads.

13. A sprinkler system as in claim 5 wherein the sprinkler head comprises a receiver to receive a command of running or not running from other sprinkler heads to coordinate with other sprinkler heads.

14. An automatic sprinkler system for providing irrigation to a soil area, the system comprising:
   a plurality of wireless sensors for sensing soil conditions, each of the wireless sensors comprising a wireless transmitter for transmitting data related to the sensed soil conditions;
   a first wireless sensor of the plurality of wireless sensors for sensing the soil conditions, the first wireless sensor comprising a first wireless receiver for receiving the transmitted data from the plurality of wireless sensors, the first wireless sensor transmitting a combined data of soil conditions from the plurality of wireless sensors and the first wireless sensor;

a sprinkler head comprising a second wireless receiver for receiving the transmitted combined data from the first wireless sensor; the sprinkler head comprising adjustable water flow controller and on-off controller;

wherein the sprinkler head waters the soil by adjusting the water flow controller and the on-off controller based on the received combination data.

15. A sprinkler System as in claim 14 wherein the soil conditions are soil moisture, humidity, sun light, or plant characteristics.

16. A sprinkler system as in claim 14 further comprising a microchip controller to process the data received from the first wireless sensor into sprinkler commands to control the sprinkler head.

17. A sprinkler system as in claim 14 wherein the sprinkler head comprises a sprinkler transmitter to transmit a command of running or not running to coordinate with other sprinkler heads.

18. A sprinkler system as in claim 17 wherein the other sprinkler heads each comprise a sprinkler receiver to receive commands of running or not running from other sprinkler heads to coordinate with other sprinkler heads.

* * * * *